(12) United States Patent
Singh et al.

(10) Patent No.: US 7,359,897 B2
(45) Date of Patent: Apr. 15, 2008

(54) SYSTEM AND METHOD FOR DOCUMENT MANAGEMENT AND RETRIEVAL

(75) Inventors: Harpreet Singh, Orange, CA (US); Louis Ormond, Irvine, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 364 days.

(21) Appl. No.: 11/142,871

(22) Filed: Jun. 2, 2005

(65) Prior Publication Data

US 2006/0277160 A1    Dec. 7, 2006

(51) Int. Cl.
*G06F 7/00* (2006.01)
*G06F 17/30* (2006.01)
(52) U.S. Cl. .................... 707/4; 707/2; 707/3
(58) Field of Classification Search ............. 707/1–206
See application file for complete search history.

(56) References Cited

U.S. PATENT DOCUMENTS

| | | | |
|---|---|---|---|
| 5,897,643 A | 4/1999 | Matsumoto | |
| 6,718,948 B2 | 4/2004 | Vahle et al. | |
| 6,732,090 B2* | 5/2004 | Shanahan et al. | 707/3 |
| 6,807,632 B1* | 10/2004 | Carpentier et al. | 713/165 |
| 2002/0010679 A1 | 1/2002 | Felsher | |
| 2003/0033287 A1* | 2/2003 | Shanahan et al. | 707/3 |
| 2003/0033288 A1* | 2/2003 | Shanahan et al. | 707/3 |
| 2003/0061200 A1* | 3/2003 | Hubert et al. | 707/3 |
| 2003/0061201 A1* | 3/2003 | Grefenstette et al. | 707/3 |
| 2003/0065898 A1 | 4/2003 | Flamma et al. | |
| 2003/0069877 A1* | 4/2003 | Grefenstette et al. | 707/2 |
| 2003/0225721 A1 | 12/2003 | Seifi | |
| 2004/0098546 A1 | 5/2004 | Bashant et al. | |
| 2004/0205448 A1* | 10/2004 | Grefenstette et al. | 715/500 |
| 2005/0022114 A1* | 1/2005 | Shanahan et al. | 715/513 |
| 2005/0080820 A1 | 4/2005 | Koppel et al. | |
| 2006/0080307 A1* | 4/2006 | Carpentier et al. | 707/3 |
| 2006/0106782 A1* | 5/2006 | Blumenau et al. | 707/3 |

* cited by examiner

*Primary Examiner*—Mohammad Ali
*Assistant Examiner*—Angelica Ruiz
(74) *Attorney, Agent, or Firm*—Tucker Ellis & West LLP

(57) ABSTRACT

A system and method for managing and retrieving electronic documents in a document management system. Multiple virtual record containers are contained in a document management system, with each container associated with a corresponding record locator. Each record locator is a unique identifier, and is in turn associated with one or more items, such as files, folders, documents, groups of folders, or images. Each of these items are associated with one or more record locators, allowing them to be stored in the corresponding record container. A user is able to download all associated items of the a record container to a desktop, irrespective of the drive or directory in which each of those items reside.

14 Claims, 7 Drawing Sheets

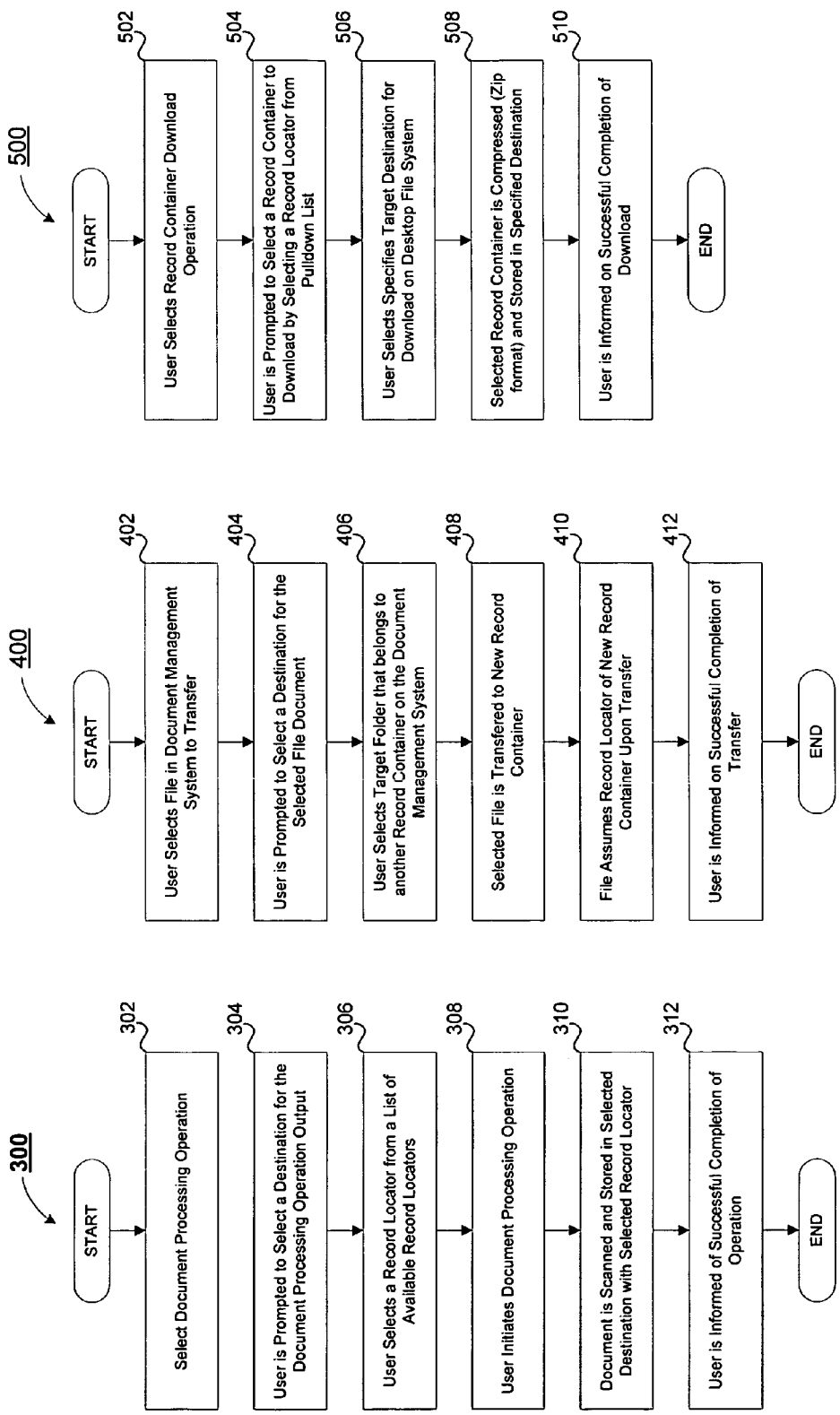

SYSTEM AND METHOD FOR DOCUMENT MANAGEMENT AND RETRIEVAL

BACKGROUND OF THE INVENTION

This invention is directed to a system and method for document management. More particularly, this invention is directed to a document management and retrieval system and method.

In the typical document management system, each document is identified by attributes such as name, creation or modification date, author, meta-data keywords, content, folder names and the like. In operation, the storage location of each document in the document management system is relegated to a single directory corresponding to the location of the document management system itself. These document management systems are not capable of associating multiple documents in multiple locations to a single identifier.

In addition, current document management systems do not allow a user to group multiple documents, folders, or folder trees into a single, virtual container. These document management systems do not allow a user to associate a single or multiple keywords to the virtual container. Furthermore, present document management systems do not have the capability of locating one or more documents, folders or folder trees using a single keyword or multiple keywords.

There is a need for a method and system for managing and retrieving electronic documents in a document management system.

SUMMARY OF THE INVENTION

In accordance with the present invention, there is provided a system and method for document management.

Still further, in accordance with the present invention, there is provided a system and method for managing and retrieving electronic documents in a document management system.

Still further, in accordance with the present invention, there is provided a document management and retrieval system. The system includes a storage adapted to store multiple electronic data records. The system also includes a digital identifier input adapted to receive multiple digital record identifiers, which are then each associated with a selected subset of electronic data records in the storage. The system then receives query data including a digital identifier associated with a subset of electronic records of interest. The query data is then compared to a set of digital identifiers, each of which is associated with a subset of electronic data records in the storage. The result of this comparison is used to retrieve a data record corresponding to a matching record identifier. Output means are then used to communicate the data representing the matching record subset to an associated output.

Still further, in accordance with the present invention, there is provided a method for document management and retrieval. The method begins by storing multiple electronic data records in an associated storage device. Next, multiple digital record identifiers are received and each received digital record identifier is associated with a selected subset of electronic data records in the storage. Query data is then received, including data containing a digital identifier associated with a subset of the electronic data records of interest. The query data is then compared to a set of digital identifiers, with each identifier being associated with a subset of electronic data records in the storage. Matched record data is then retrieved corresponding to a matched digital identifier resulting from the comparison of the query data and the set of digital identifiers in the storage. The matched record subset data is then communicated to an associated output.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description, serve to explain the principles of the invention.

FIG. 3 is a flow chart illustrating a scan to record container method in accordance with the present invention;

FIG. 4 is a flow chart illustrating a move item to record container method in accordance with the present invention;

FIG. 5 is a flow chart illustrating a download record container method in accordance with the present invention;

DETAILED DESCRIPTION OF THE PREFERRED EMBODIMENT

The present invention is directed to a system and method for document management. More particularly, the present invention is directed to a system and method for managing and retrieving electronic documents on a document management system.

Figure 1A:
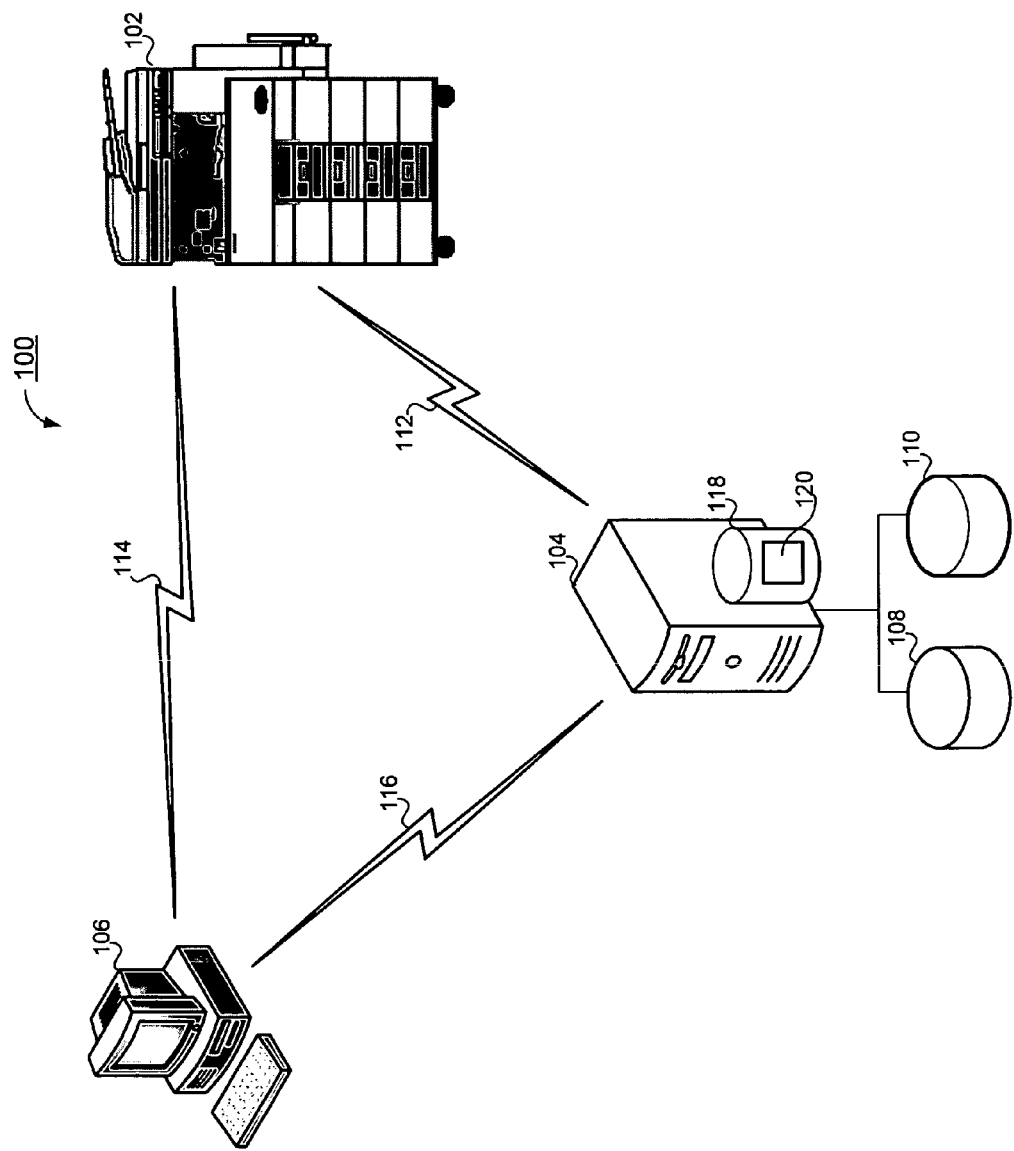
FIG. 1A is a block diagram illustrating a system in accordance with the present invention.

Turning now to FIG. 1A, there is shown a diagram illustrating the system 100 in accordance with the present invention. As shown in FIG. 1A, the system 100 suitably includes a document processing device 102. It will be appreciated by those skilled in the art that document processing device 102 is any suitable document processing device known in the art, such as a copier, printer, scanner, facsimile, multifunction peripheral device, and the like, or any combination thereof. Suitable commercially available document processing peripherals include, but are not limited to, the Toshiba e-Studio Series Controller. Preferably, the document processing device includes a user-interface, suitably adapted to interact with a user. In one embodiment, the user-interface is a touch screen display capable of both displaying data and receiving input relating to the operation of the document processing device 102.

The document processing device 102 is communicatively connected to a server 104, via a communications link 112. As will be understood by those skilled in the art, the communications link is any means for communication between electronic devices, including for example and without limitation, the Internet, a local area network, an Ethernet based connection, a wide area network, a Token Ring connection, a Bluetooth connection, a Wi-Fi connection, an IEEE802.11(x) connection, an infrared connection, a telephony connection, cellular connection and the like, or any combination of communications means thereof.

As shown in FIG. 1A, the server 104 is in data communication with one or more record containers 108, 110. In the preferred embodiment, the record containers 108, 110 are suitably stored in an associated storage device, communicatively coupled to the server 104. The storage device is any data storage means known in the art, including, but not limited to, hard disk drive, flash memory drive, optical storage, magnetic storage and the like. As will be understood by those skilled in the art, the record containers 108, 110 are capable of being stored on the integrated hard disk or other storage means of the server 104. In accordance with the present invention, the record containers 108, 110 are virtual storage units in which are stored various folders, groups of folders, documents, image files and the like. Each folder, group of folders, document, image, and file remains in its original location, but are associated with the record container in such a manner that when a record container is opened by a user, all folders, groups, document, images and file associated with the record container are displayed in such a manner as to give the appearance of all being stored in the same location. However, the skilled artisan will appreciate that each item associated with the record container remains in its original location in storage.

Associated with each record container 108, 110 is a record locator. In the preferred embodiment, the record locator is a unique identifier defined by an authorized user, or by the document management system. As will be understood by those skilled in the art, the record locator is capable of being any unique number or alphanumeric combination used to identify the items located within the respective record container. For example, the present invention is suitably adapted to use a date of birth, case number, social security number, docket number, alphanumeric string generated by a user, a first and last name, and the like. Each item located within the record container is advantageously associated with the record locator corresponding to that particular record container.

Figure 1B:
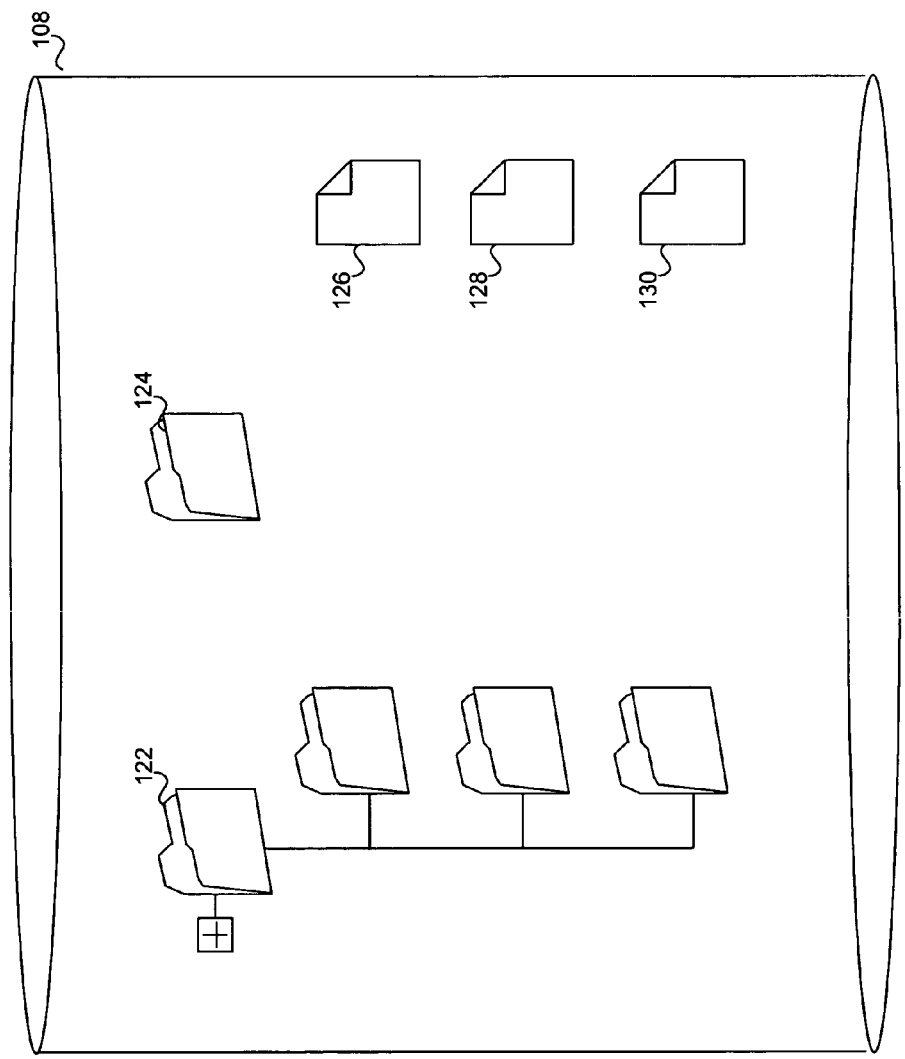
FIG. 1B is a block diagram illustrating a record container in accordance with the present invention.

In one embodiment, an item is capable of being associated with multiple record locators, thereby allowing multiple record containers to have the same item. It will be appreciated by those skilled in the art that in such an embodiment, only a single electronic copy of an item is necessary as each record container is associated with the same item by means of the multiple record locators associated with the item. In an alternate embodiment, the record containers are capable of being associated with more than one record locator. FIG. 1B illustrates a block diagram depicting the contents of the record container 108. As shown in FIG. 1B, the record container 108 includes a folder tree 122, a folder 124, and documents 126, 128 and 130. Each of the items 122-130 are suitably associated with a record locator or locators corresponding to the record container 108.

The server 104 further functions to store a document management system 120, capable of tracking and organizing various user and system generated electronic files. The skilled artisan will appreciate that any document management system enabling the creation, storage, and tracking of multiple documents of varying formats, known in the art, is capable of implementing the present invention. The skilled artisan will appreciate that the document management system is capable of being implemented remotely from the server 104; however, the document management system need not be separate from the server 104 and in the preferred embodiment, the document management system is suitably stored in a storage device 118 associated with the server 104. The storage device 118 of the server 104 is any suitable form of data storage known in the art, including, but not limited to, hard disk drive storage, optical storage, flash memory and the like. In accordance with the present invention, the user or system is prompted at the time the electronic file is generated or added to the document management system, to designate a particular record container for storage thereof. Further in accordance with the present invention, once a record container is selected, the electronic file is automatically associated with the record locator corresponding to the selected record container. The process by which this association occurs will be more fully understood in connection with the description of FIGS. 2-9, discussed below.

The system 100 further includes one or more user devices, illustrated in FIG. 1A as the personal computer 106. As will be understood by those skilled in the art, the user device 106 is in data communication with the document processing device 102 via a communications link 114, as well as in data communication with the server 104 via a communications link 116. It will be understood by those skilled in the art that the communications links 114, 116 are any means for communication between electronic devices, including and without limitation, a local area network, a wide area network, an Ethernet connection, an infrared connection, a Bluetooth connection, a Token Ring connection, an IEEE 802.11(x)-based connection, the Internet, a Wi-Fi connection, a telephony connection, cellular connection and the like, or any combination of communications means thereof.

The user device 106 preferably includes a display capable of displaying a graphical user interface in accordance with the preferred embodiment of the present invention. Via the user device 106, an associated user is able to access the document management system of the server 104 and interface with the document processing device 102. In operation, the user is able to generate new items for inclusion in a record container 108, 110, download an entire record container 108, 110, transmit the record container via facsimile or email, print the record container 108, 110 at the document processing device 102, edit the contents of the record container 108, 110, and the like.

In accordance with the present invention, a user is able to add items to the record container 108 or record container 110 via an integrated user-interface located on the document processing device 102. As illustrated in FIG. 1A, the document processing device 102 is preferably a multifunction peripheral device capable of copying, faxing, scanning, printing and any combination thereof. In operation, when a user desires to scan a document into the document management system record container 108, the user places the original document on the scanning surface of the document processing device 102. The user is then prompted to select the desired record container 108 for storage of the scanned item. Alternatively, the user is able to select a record locator to be associated with the scanned item, which dictates the record container 108 in which the scanned item will be stored. Once the target destination is selected, the user initiates the scanning and the original document is scanned into a preferred format using any means known in the art. The scanned item is then stored in the destination, while associated with the record container 108 via the selected record locator.

Figure 2:
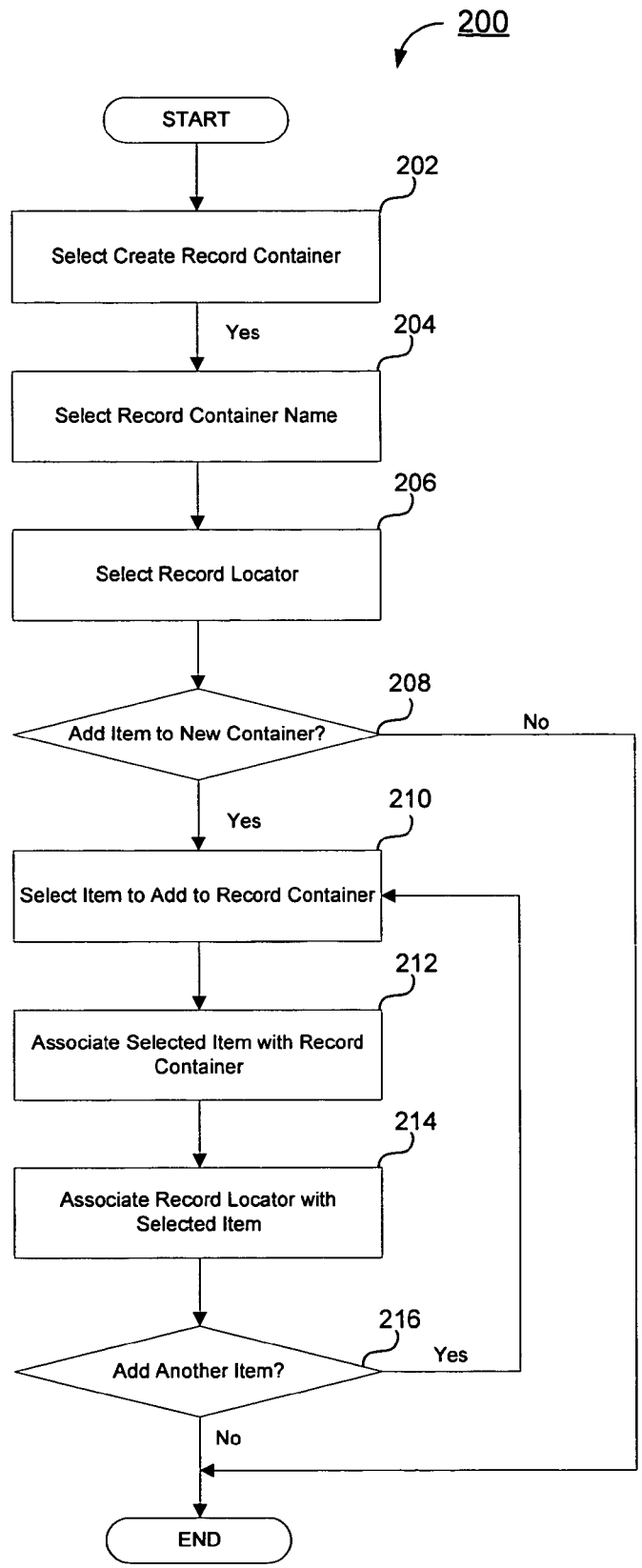
FIG. 2 is a flow chart illustrating a record container method in accordance with the present invention.

Operation of the present invention will best be understood by those skilled in the art when viewed in connection with the methods and screen templates illustrated in FIGS. 2-9. Turning now to FIG. 2, there is shown a flow chart illustrating the creation of a record container in accordance with the present invention. The method begins with the selection by a user to generate a new record container at step 202. It will be understood by those skilled in the art that the selection is made by the user via any means known in the art. In the preferred embodiment, the user interacts with the document management system via a graphical user interface from the user device 106 or the front panel of the document processing device 102.

The user is then prompted at step 204 to select a record container name. The record container name is capable of being any alphanumeric indicator selected by the user or, in one particular embodiment, the document management system generates the record container name. It will be appreciated by those skilled in the art that the present invention is capable of employing authorization and authentication of users to designate user rights and access to record containers. Those skilled in the art will appreciate that any means of authenticating the identity of the user are capable of being implemented herein, including and without limitation, biometric, password, user ID and password, and the like.

After selecting the desired container name, the user is prompted at step 206 to select a record locator associated with the record container. In one embodiment, the document management system generates the unique record locator corresponding to the new container. As previously discussed, the record locator is capable of being selected from a date of birth, case number, social security number, docket number, alphanumeric string generated by a user, a first and last name, and the like. A determination is then made at step 208 whether the user desires to add an item to the new container. As will be understood by those skilled in the art, the items capable of being added to a container include any document or image format supported by the underlying document management system, any other document or image format, a file folder, group of file folders, tree of file folders, drive, directory, or other electronic file known in the art. When no items are to be added to the newly created record container, the container is stored in the document management system and the process terminates.

When it is determined that an item is desired to be stored in the record container, flow proceeds to step 210 where the item to be added to the record container is selected. It is to be appreciated by those skilled in the art that while the term stored is used with respect to the items and record containers, the present invention does not physically store the items in the record containers on the associated storage device. As the skilled artisan will appreciate, the items are virtually stored in the record containers, in accordance with the present invention. The selected items are then associated with the record container at step 212. In the preferred embodiment, the user is able to click-and-drag items into the record container via the associated user interface. It will be appreciated by those skilled in the art that the movement of an item into the record container of interest is not limited to a graphical user interface approach, but is also capable of being implemented as menu driven, or copy-and-paste type instructions. In all circumstances, upon association of the selected item with the selected record container, the item is automatically associated with the record locator corresponding to the selected record container at step 214. The skilled artisan will appreciate that in accordance with the present invention, the item associated is capable of incorporating more than one record locator, thereby enabling the same electronic item to be associated with more than one record container. It will be appreciated that the foregoing enables the present invention to prevent multiple copies of the same document from being stored and using up storage space.

A determination is then made at step 216 as to whether the user desires to move additional items into the record container. When additional items are to be associated with the record container, flow proceeds back to step 214 and the next item to be added is selected. When no further items remain to be associated with the record container, the new record container and associated items are stored in the document management system on the server 104.

Figure 6:
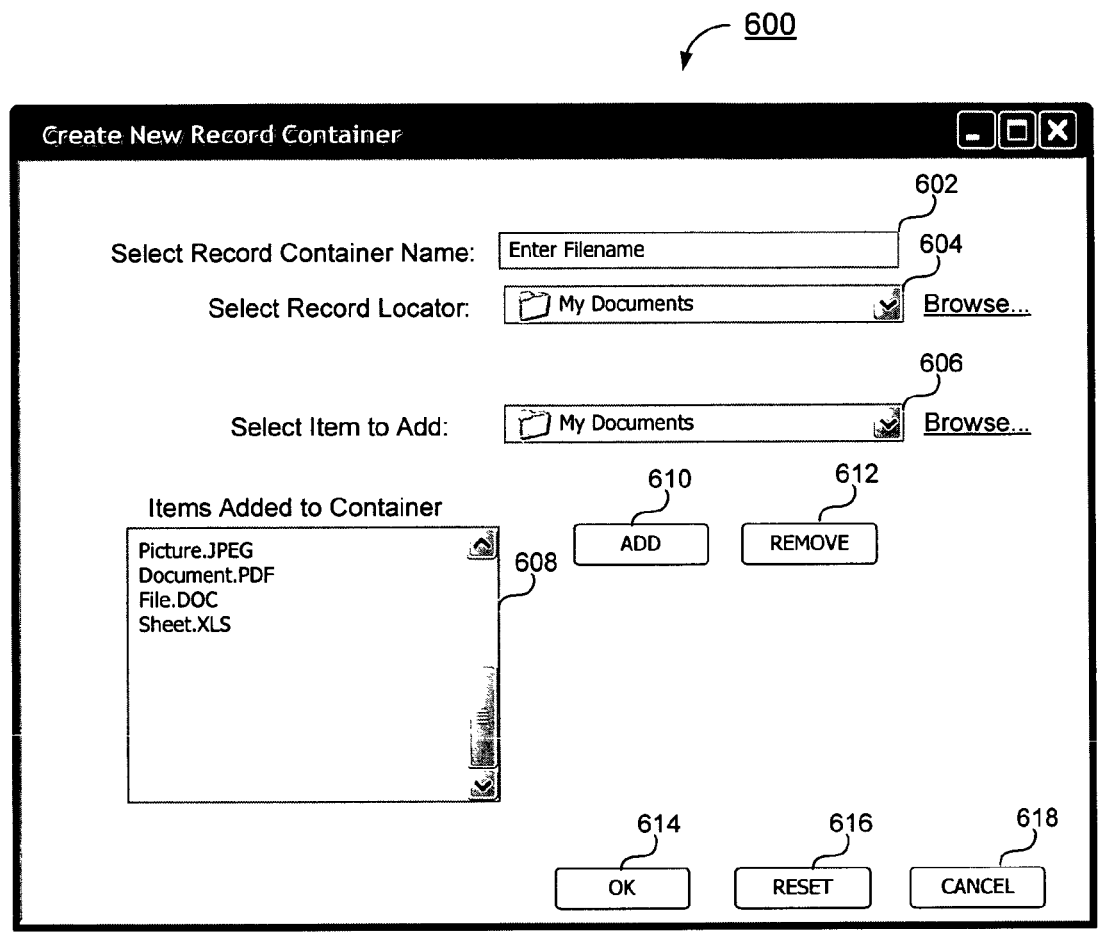
FIG. 6 is a template screen illustrating the record container in accordance with the present invention.

Referring now to FIG. 6, there is illustrated a template screen 600 illustrating the record container generation in accordance with the present invention. As shown in the FIG. 6, the user is prompted to input a name for the new record container in the fill-in box 602. As previously discussed, the authorized user is able to select any desired record container name in accordance with the policies set by the system administrator. The user then selects the appropriate record locator from the pull-down list 604 containing available record locators. Once the user has selected the new record container name and an associated record locator, the user then selects those items to add to the record container from the pull-down box 606.

The user then selects the desired item and clicks the "ADD" button 610 to add the selected item into the record container. A listing of items present in the record container is shown in the dialog box 608. To remove an item, the user simply selects the item in the dialog box 608 and clicks the "REMOVE" button 612 to remove the item from the record container. Those skilled in the art will appreciate that the user is also capable of having multiple windows open and dragging a file or item into the dialog box 608 will also function to add items to the record container. Once the user has finished adding items, the user selects the "OKAY" 614 button to signify acceptance of the selections made and the new record container is stored in the document management system. When the user desires to add another new record, or to remove all previous data input, the user selects the "RESET" button 616, and the screen 600 reverts to a blank document, with all input fields cleared. In addition, should the user desire to delete all input data and not save the new record container, the user selects the "CANCEL" button 618 and the operation terminates.

It will be understood by those skilled in the art that the present invention enables multiple operations to use the record locator and record container method of the present invention. For example and without limitation, FIGS. 3, 4 and 5 denote an add operation, a transfer an item to another record container operation, and a download record container operation, respectively. It will be apparent to those skilled in the art that other operations are equally capable of employing the record container method described herein, including, without limitation, scanning operations, facsimile operations, printing operations, email operations and the like.

Turning now to FIG. 3 there is illustrated an add to record container operation, represented by the flow chart 300. In accordance with the present invention, when a user desires to add an electronic representation of a document processing operation, the user initiates the document processing operation via any means known in the art at step 302. For example, the user is able to select the scan operation using the user interface of the document processing device 102 to generate an electronic representation of a hard copy device. Once the document processing operation has been selected, the user is prompted to select the destination for the output of the document processing operation at step 304. Following selection of the destination, the user selects at step 306 a record locator from a list of available record locators. In a preferred embodiment, the user is prompted to fill in required and optional metadata which are used to complete the scan. In this embodiment, the user selects the record locator from a list of record locators and types in the metadata using the graphical user interface of the document processing device 102. It will be understood by those skilled in the art that the user is able to alternatively select an existing record locator, or input a new record locator, which is then added to the list of available record locators for later use.

The user then initiates the document processing operation for the document processing device 102 at step 308. The document is subsequently processed and stored in the selected destination and associated with the selected record locator at step 310. The user is then informed of the successful completion of the document processing operation at step 312. Those skilled in the art will appreciate that the foregoing operation is advantageously initiated from the document processing device 102, however such operation is also capable of being initiated and carried out using the user device 106.

Figure 7:
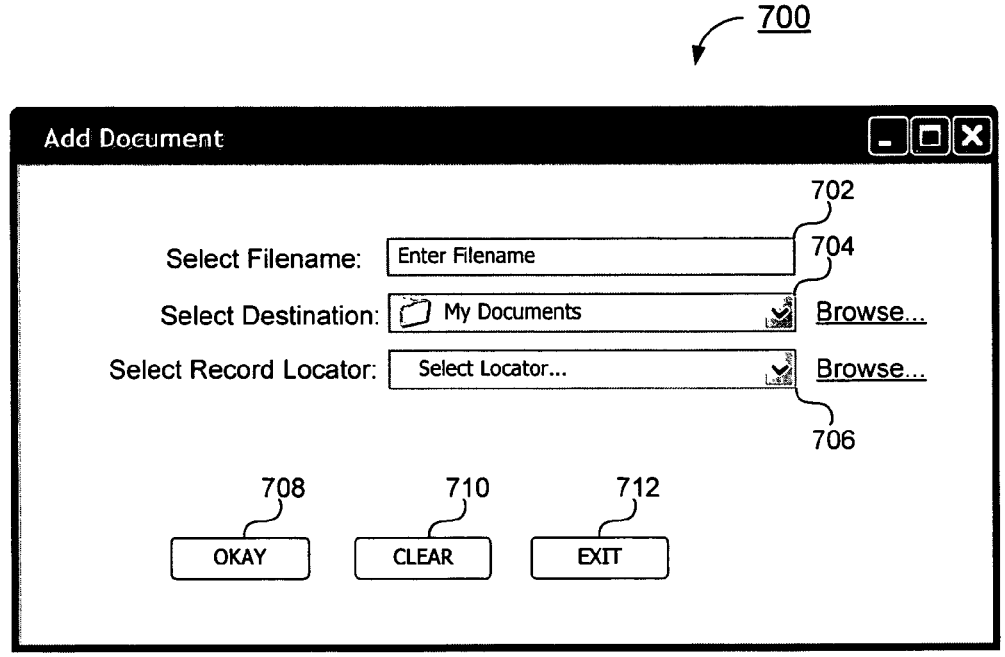
FIG. 7 is a template illustrating an add scan job selection screen in accordance with the present invention.

Turning now to FIG. 7, there is shown a template screen 700 illustrating an example graphical user interface to add the output of a document processing operation to a record container in accordance with the present invention. The user has selected the output document processing operation to record container option at the document processing device 102 user interface panel. The add output screen 700 is then displayed and the user is prompted to fill-in the filename 702 for the data to be generated by the document processing operation. The user also selects the desired destination for the data via a pull-down menu 704. It will be appreciated by those skilled in the art that the pull-down menu 704 suitably includes destinations on the document management system of the server 104, integrated storage of the document processing device 102, removable storage, and the like.

The user then selects from the pull-down menu 706 the appropriate record locator to associate with the output data. As previously discussed, the record locator indicates in which of the accessible record containers the scanned image data will be placed. Alternatively, the user selects one or more additional record locators, enabling the output data to be associated with more than one record container. Once satisfied with the selections thus made, the user initiates the document processing operation by selecting the "OKAY" button 708. The document processing device 102 then performs the document processing operation, associates the output data with the selected record locator, and stores the output data in the selected destination. When the user desires to remove all data from the fields of the screen 700, the user selects the "CLEAR" button 710 and all input fields are cleared, whereupon the user is able to input different or corrected input data. When the user desires to cancel the document processing operation, the user selects the "EXIT" button 712 and the scan to record container job is terminated.

Referring now to FIG. 4, there is shown a flow chart 400 illustrating the transfer of an item to a record container 110 in accordance with the present invention. Beginning at step 402, the user selects the desired item in the document management system to transfer. The desired item is capable of being independent of any record container, or alternatively, the item is capable of already being associated with a record container 108. The user is then prompted at step 404 to select a destination for the selected item. With respect to FIG. 4, the item is suitably transferred from one folder in record container 108 to another target folder associated with a different record container 110. The skilled artisan will appreciate that various originations and destinations are capable of being used in accordance with the process described in FIG. 4, without departing from the scope of the present invention.

The user then selects the target folder into which the selected item is to be transferred at step 406. Preferably, the selected target folder is associated with another record container 110 on the document management system, different from the originating record container 108. The selected file is then transferred to the target folder at step 408. As previously discussed, any means for transferring a file from one location to another in a computer environment is capable of being employed by the present invention, including, without limitation, click-and-drag, menu driven, cut-and-paste, and the like. The transferred item then assumes the record locator of the new record container into which it was moved at step 410. Thus, the transferred item inherits the record locator or record locators, if any, of the destination folder. The user is then notified at step 412 that the move operation has been successfully completed.

It is to be understood by the skilled artisan that the operation described above with respect to FIG. 4 is equally capable of being implemented by the user device 106 and the user interface panel of the document processing device 102. The skilled artisan will appreciate that the server 104, and via the server 104, the record containers 108, 110 are accessible by the user device 106 via communications link 116 and the by the document processing device 102 via communications link 112. In either event, a suitable graphical user interface is advantageously employed to facilitate the transfer of the selected item.

Figure 8:
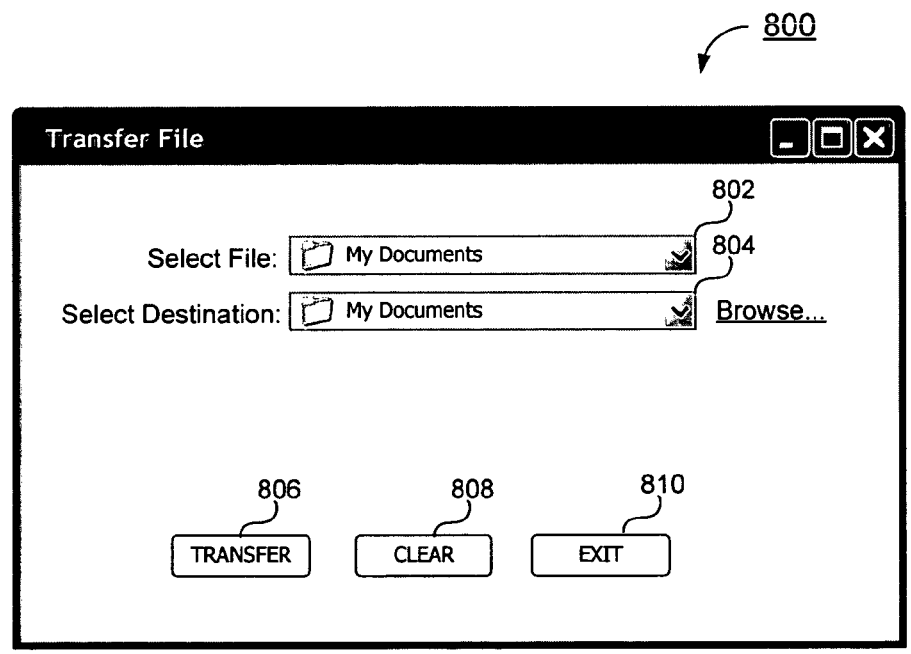
FIG. 8 is a template illustrating a move file screen in accordance with the present invention.

Referring to FIG. 8, there is illustrated a template screen 800 depicting the transfer an item operation performed in accordance with the present invention. As shown in FIG. 8, the user selects the desired item to be transferred from the pull-down menu 802. The user then selects from the pull-down menu 804 the desired destination for the item. As the skilled artisan will appreciate, the selected destination is capable of being a new record container, a different folder in the same record container, a folder in a different record container, a folder not in a record container and the like. The item being transferred, for example, is capable of being an image file, a document file, a folder, a group of folders, and the like. Once the desired item and the desired destination have been selected by the user, the user initiates the transfer by selecting the "TRANSFER" button 806. When initiated, should the item be transferred to a different record container, or a folder in a different record container, the record locator associated with the destination is automatically associated with the transferred item. When the user elects to clear the input fields of data, the user selects the "CLEAR" button 808 and the input fields are cleared of data. Should the user desire to terminate the transfer, or upon completion of the move, exit the operation, the user selects the "EXIT" button 810.

Turning next to FIG. 5, there is shown a flow chart 500 suitably illustrating a download capability of the present invention. The present invention enables the downloading of a record container, including all of its associated contents, as a single operation, irrespective of where in the document management system the individual files, folders, and groups are physically located. Beginning at step 502, the user selects the download record container operation. The user is then prompted at step 504 to select a record container to download at step 504. In the preferred embodiment, the user selects the desired record container from a list of accessible record containers.

The user then selects the target destination for the record container at step 506. For example, the user is able to select the user device 106 desktop as the download destination, some removable storage media, or alternative network location. Once the user has specified the desired destination, the selected record container is advantageously compressed and stored in the specified destination. In the preferred embodiment, the record container is compressed into ZIP format. Those skilled in the art will appreciate that other compression formats are also capable of being employed, without departing from the present invention. In an alternate embodiment, no compression is selected and the record container is downloaded and stored in uncompressed format. Upon completion of the download, the user is notified at step 510.

Figure 9:
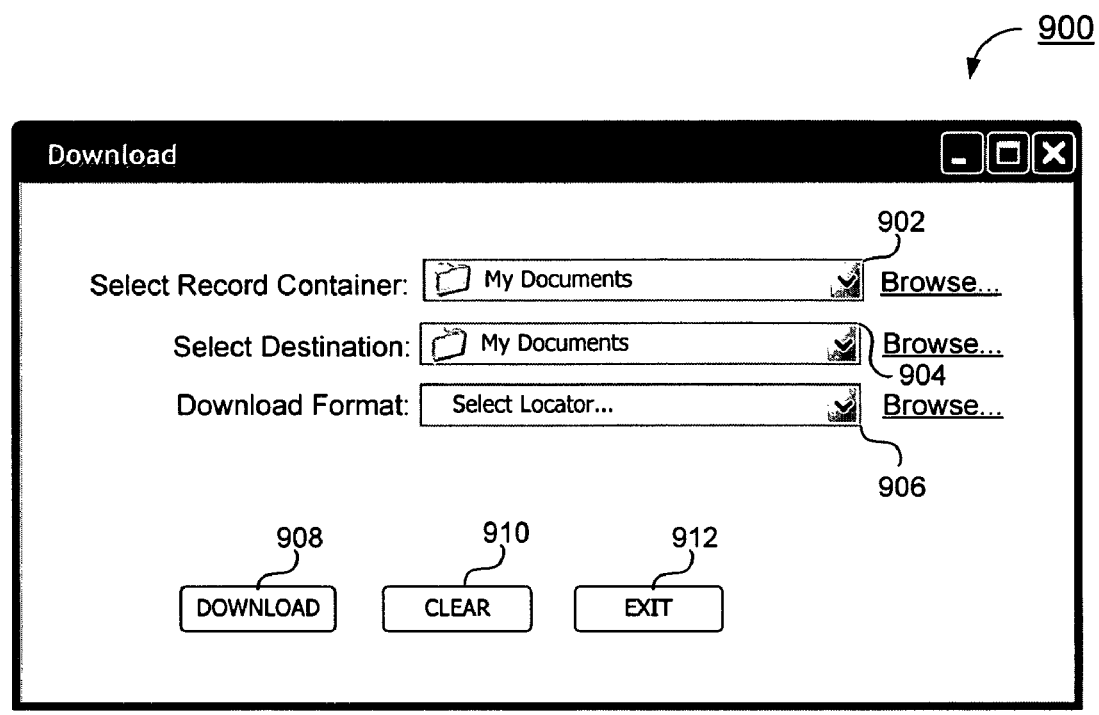
FIG. 9 is a template illustrating a download record container screen in accordance with the present invention.

Turning now to FIG. 9, there is shown a template screen 900 illustrating a download operation in accordance with the present invention. As previously discussed, the present invention advantageously enables the downloading of an individual record container, which includes all associated folders, groups of folders, files and the like, in a single operation. The user selects the desired record container to be downloaded from the pull-down menu 902 of accessible record containers. It will be understood by those skilled in the art that the user is capable of being restricted in which record containers the user is allowed to view and/or download in accordance with system settings.

After selecting the desired record container for downloading, the user selects from the pull-down menu 904 the desired destination for the record container. For example, the user is able to select the user device 106 desktop, a removable storage medium, and the like as the destination. The user is then prompted to select a desired download format from the pull-down menu 906. As will be understood by those skilled in the art, the download format includes, but is not limited to, a compressed or uncompressed format, as well as the selection of the type of compression to be employed. As the present invention allows for a large number of folders, groups of folders, and the like to be associated with a single record container, the ability to compress the container prior to downloading saves time as well as storage space at the destination.

Once the desired item, the desired destination, and the download format have been selected by the user, the user initiates the transfer by selecting the "DOWNLOAD" button 908. When initiated, each folder, group of folders, file, image and the like associated with the record locator that corresponds to the selected record container is gathered and compressed, if compression has been selected. The gather record container is then sent to the selected destination. When the user elects to clear the input fields of data, the user selects the "CLEAR" button 910 and the input fields are cleared of data. Should the user desire to terminate the download, or upon completion of the download, exit the operation, the user selects the "EXIT" button 912. Those skilled in the art will appreciate that the download operation is equally adaptable to downloading by record locator, as well as by the record container download described above.

It will be understood by those skilled in the art that the application of the present invention enables the locating of all documents, folders, directories and the like associated with a particular record locator. Furthermore, the present invention enables the user to associate multiple documents, folders, and folder trees to one or more record locators, which in turn are capable of being associated with a single, or multiple record containers. In addition, the present invention enables the user to search for multiple documents, folders and folder trees based on one or more record locators.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program, for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A document management and retrieval system comprising:

a storage adapted for storing a plurality of electronic data records;

digital identifier input means adapted for receiving a plurality of digital record identifiers;

association means adapted for associating each received digital record identifier with at least one of a file storage location and an electronic data record in the storage;

means adapted for receiving, from an associated user, digital record identifier selection data representative of at least one digital record identifier to be associated with the at least one of a first file storage location and a first electronic data record;

means adapted for propagating the at least one digital record identifier to at least one of a second file storage location and a second electronic data record in accordance with at least one of a file move operation and a file copy operation;

means adapted for receiving query data inclusive of a digital record identifier associated with a subset of electronic data records of interest in accordance with the received digital record identifier selection data;

comparison means adapted for comparing the query data to a set of digital identifiers, each digital identifier being associated with a subset of electronic data records in the storage;

means adapted for retrieving matched record data corresponding to a matched digital identifier resultant from a comparison completed by the comparison means; and output means adapted for communicating data representative of the matched record subset to an associated output.

2. The document management and retrieval system of claim 1, wherein each digital record identifier is comprised of data representative of an alphanumeric string.

3. The document management and retrieval system of claim 2, wherein the digital identifier input means includes means adapted for receiving a digital record identifier from an associated user.

4. The document management and retrieval system of claim 2, wherein the digital identifier input means includes means adapted for receiving a digital record identifier in accordance with at least one data item contained in a subset of electronic data records associated therewith.

5. The document management and retrieval system of claim 2, wherein the digital identifier input means includes means adapted for receiving a digital record identifier from a preexisting digital record identifier.

6. The document management and retrieval system of claim 1, wherein the output means includes means adapted for batched communication of electronic data records of the matched record subset to a selected destination.

7. The document management and retrieval system of claim 6, wherein the selected destination includes at least one device selected from a group consisting of a printer, e-mail, secondary storage device, alternative storage location, and facsimile.

8. A method for document management and retrieval, comprising the steps of:

storing a plurality of electronic data records in an associated storage;

receiving a plurality of digital record identifiers;

associating each received digital record identifier with at least one of a file storage location and an of electronic data record in the storage;

receiving, from an associated user, digital record identifier selection data representative of at least one digital record identifier to be associated with the at least one of a first file storage location and a first electronic data record;

propagating the at least one digital record identifier to at least one of a second file storage location and a second electronic data record in accordance with at least one of a file move operation and a file copy operation;

receiving query data inclusive of a digital record identifier associated with a subset of electronic data records of interest in accordance with received digital record identifier selection data;

comparing the query data to a set of digital identifiers, each digital identifier being associated with a subset of electronic data records in the storage;

retrieving matched record data corresponding to a matched digital identifier resultant from the comparison of the query data and the set of digital identifiers; and communicating data representative of the matched record subset to an associated output.

9. The method for document management and retrieval of claim 8, wherein each digital record identifier is comprised of data representative of an alphanumeric string.

10. The method for document management and retrieval of claim 9, further comprising the step of receiving a digital record identifier from an associated user.

11. The method for document management and retrieval of claim 9, further comprising the step of receiving a digital record identifier in accordance with at least one data item contained in a subset of electronic data records associated therewith.

12. The method for document management and retrieval of claim 9, further comprising the step of receiving a digital record identifier from a preexisting digital record identifier.

13. The method for document management and retrieval claim 8, further comprising the step of communicating batched electronic data records of the matched record subset to a selected destination.

14. The method for document management and retrieval of claim 13, wherein the selected destination includes at least one device selected from a group consisting of a printer, e-mail, secondary storage device, alternative storage location, and facsimile.

* * * * *